(12) United States Patent
Doudement

(10) Patent No.: US 7,621,738 B2
(45) Date of Patent: Nov. 24, 2009

(54) PREFORM CONVEYOR SYSTEM PROVIDED WITH MEANS FOR EJECTING BADLY SEIZED PREFORMS

(75) Inventor: Christophe Doudement, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 451 days.

(21) Appl. No.: 11/631,408

(22) PCT Filed: Jul. 4, 2005

(86) PCT No.: PCT/EP2005/053166

§ 371 (c)(1),
(2), (4) Date: Mar. 2, 2007

(87) PCT Pub. No.: WO2006/005694

PCT Pub. Date: Jan. 19, 2006

(65) Prior Publication Data

US 2008/0044510 A1 Feb. 21, 2008

(30) Foreign Application Priority Data

Jul. 8, 2004 (FR) .................................. 04 51476

(51) Int. Cl.
*B29C 49/42* (2006.01)
(52) U.S. Cl. .................. 425/534; 198/341.05; 198/364; 198/367; 198/464.4; 198/470.1

(58) Field of Classification Search ............ 198/341.01, 198/341.05, 364, 367, 464.4, 470.1, 476.1, 198/803.12; 425/534; 209/523
See application file for complete search history.

(56) References Cited

U.S. PATENT DOCUMENTS

| | | | | |
|---|---|---|---|---|
| 2,393,188 A * | 1/1946 | Reynolds | .................... | 198/367 |
| 3,428,174 A * | 2/1969 | Kulig | .......................... | 198/367 |
| 3,934,703 A * | 1/1976 | Vamvakas et al. | ......... | 198/464.4 |
| 4,158,624 A * | 6/1979 | Ford et al. | .................. | 198/367 |
| 4,572,355 A | 2/1986 | Hunter et al. | | |
| 6,446,781 B1 * | 9/2002 | De Villele | .................... | 198/364 |

FOREIGN PATENT DOCUMENTS

| | | |
|---|---|---|
| EP | 0596487 | 5/1994 |
| FR | 2794109 | 12/2000 |

* cited by examiner

*Primary Examiner*—Robert B Davis
(74) *Attorney, Agent, or Firm*—Young & Thompson

(57) ABSTRACT

A preform conveyor system (10), of the type including a number of transport elements (18) which each have at least one grasping device (26) for carrying a preform, movable between an upper release position and a lower grasping position, characterized in that each grasping device (26) is linked in terms of upward and downward axial movement to an associated bracket (46), and in that the bracket (46) includes a stud (74) designed to interact slidingly with a fixed ramp (78), when the grasping device (26) is in an intermediate axial position between its upper release position and its lower grasping position, so as to cause the grasping device (26) to slide axially into its upper release position.

7 Claims, 3 Drawing Sheets

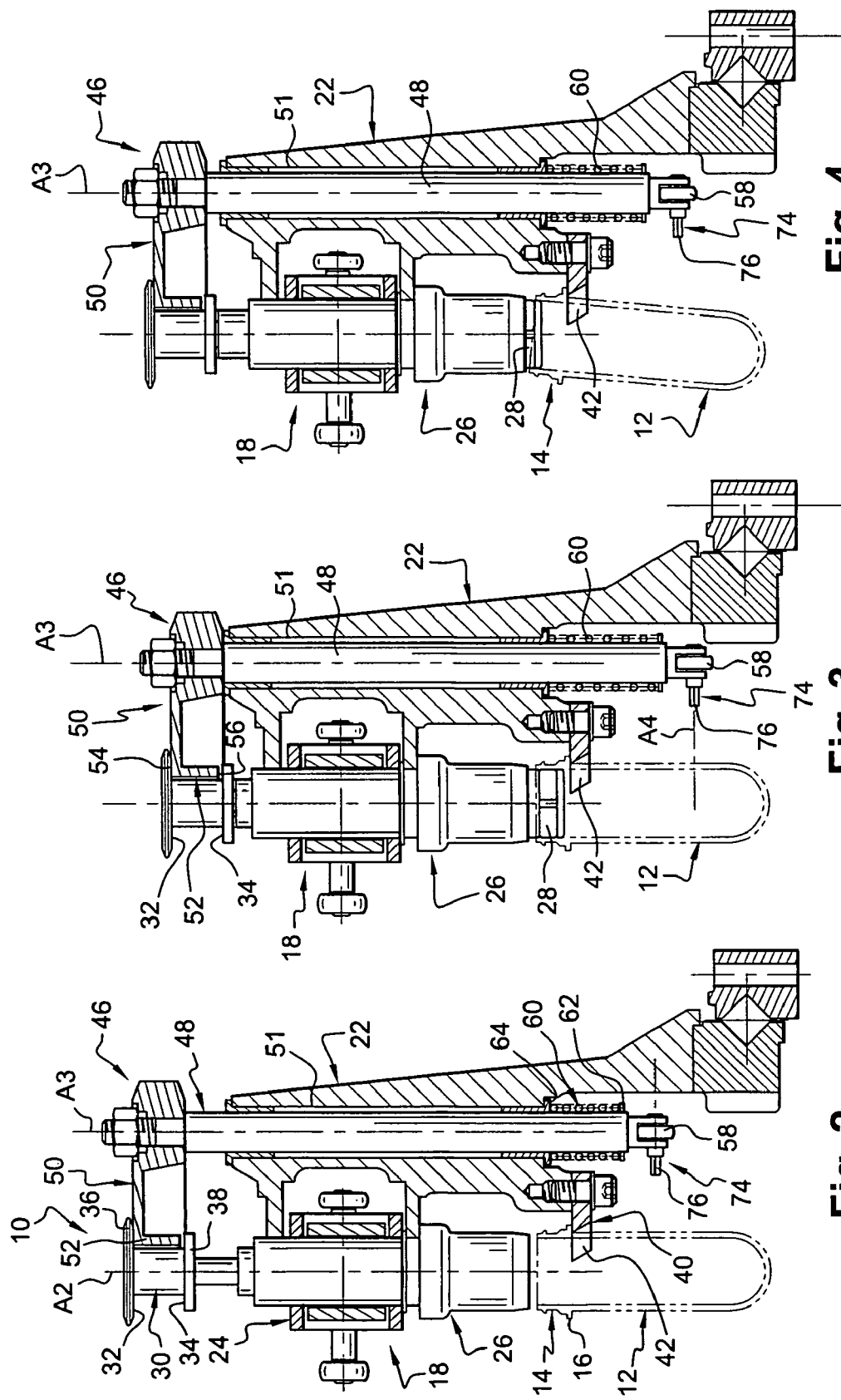

PREFORM CONVEYOR SYSTEM PROVIDED WITH MEANS FOR EJECTING BADLY SEIZED PREFORMS

The present invention relates to a preform conveyor system.

The present invention relates more particularly to a conveyor system for an installation for the manufacture of thermoplastic containers by blow molding using preforms, of the type comprising a number of transport elements which each have at least one grasping device for carrying a preform so as to convey it, in the vertical position, along a path in the downstream direction, inside the installation, of the type in which each grasping device can move along a vertical axis relative to the transport element carrying it so as, when it is brought from an upper release position to a lower grasping position, to engage axially in the neck of the preform to be seized.

Such conveyor systems are found in container blow-molding machines in which the container is obtained by blow molding by inserting a preform, produced beforehand by injection molding, in a blow-molding mould. These machines are used for example to make polyethylene terephthalate (PET) bottles.

This type of machine usually comprises an oven for heating the preforms inside at least one heating tunnel before the blow molding operation.

This oven comprises a conveyor system for conveying the preforms inside the heating tunnel.

The conveyor system may for example consist of a chain of transport elements in the form of links driven in a continuous loop.

To seize the preform, each transport element comprises a grasping device which can move axially relative to the transport element and which, when it is brought from an upper release position to a lower grasping position, engages axially in the neck of the preform.

To this end, the preform must be brought underneath the relevant transport element and held perfectly vertically in line with the latter throughout the seizing operation. However, during the seizing operation the transport element moves continuously and so the preform must also be moved continuously.

For this purpose, the preform is for example taken care of by a transport wheel comprising a disc driven in rotation about its axis and having, at its periphery, substantially semi-circular recesses. A guide in the form of an arc of a circle is positioned around part of the periphery of the disc in such a way that a preform can be clamped radially between a recess in the disc and the guide. The preform then bears via a collar at the base of its neck both on the disc and on the guide, the neck and the body of the preform extending above and below the disc, respectively. Thus, the preform is carried by the transport wheel and, owing to the rotation of the disc, follows a circular path.

The preforms and the transport elements are positioned on the transport wheel so that each preform is positioned axially exactly vertically in line with the grasping device of one of the transport elements. Thus, the grasping device can be commanded, at a point on the circumference of the wheel, into its lower grasping position to seize the preform by its neck.

Note that at this point on the circumference of the wheel, the preform still bears on the transport wheel and on the guide, but ceases to do so just after this point to allow the preform to follow the path of the transport element.

In theory, at this point on the circumference of the wheel, the preform thus bears via its collar on the transport wheel and its position is defined precisely by the recess in the disc in which it is clamped.

However, in practice, it is necessary to provide operating clearance between the preform, the disc and the guide. The preform thus has a certain freedom of movement with respect to these two elements. However, it has been observed that this freedom means that the preform may vibrate on the transport wheel, this being particularly noticeable in installations working at high speed in which the speed of movement of the preform on the transport wheel is relatively high. This vibration can affect the precision of the actual position of the neck of the preform at the point of grasping to the extent that, in some cases, the grasping device and the neck can be slightly but sufficiently out of line to prevent the preform from being grasped properly.

The provision of devices for improving the stability of the preform when it is grasped is already known, for example in document FR-A-2 794 109.

Such devices, although satisfactory, have their limits, especially when the conveyor system has to operate at very high speeds, in such a way that some preforms may be incorrectly seized by a grasping device, something which can cause major malfunctions in the machine.

The present invention aims to overcome this drawback by proposing a conveyor system which comprises means for ejecting preforms that are incorrectly positioned on the associated grasping device.

To this end, the invention proposes a conveyor system of the type described above, characterized in that each grasping device is linked in terms of upward and downward axial movement to an associated bracket which is mounted so that it can slide axially in one direction and which bears, at its lower axial end, a cam follower element, the bracket being stressed axially downward so that the cam follower element interacts with a surface of a fixed cam provided to bring the grasping device from its upper release position to its lower grasping position, in that the bracket comprises a stud with a bearing surface designed to interact slidingly with a fixed ramp comprising a control surface which is inclined relative to the vertical and oriented generally upward, when the grasping device is in an intermediate axial position between its upper release position and its lower grasping position, this intermediate axial position corresponding to an incorrect positioning of the grasping device in the preform, so that the fixed ramp brings the stud upward and causes the grasping device to slide axially into its upper release position so as to eject the associated preform, and in that the fixed ramp extends axially at a certain height in such a way that, when the grasping device is in its lower grasping position, the stud can travel under the fixed ramp in a passage provided for this purpose.

According to other features of the invention:

the conveyor system comprises a movable ramp which can take up:

an active position in which a control surface of the movable ramp is adjacent to the upstream end of the inclined control surface of the fixed ramp, and in which the control surface of the movable ramp closes off the entry to said passage so as to drive the stud upward onto the fixed ramp;

and a retracted position in which the movable ramp clears said passage to allow the stud to travel under the fixed ramp, and the conveyor system comprises an actuator that causes the movable ramp to take up the active position when a grasping device is in an intermediate axial position;

the actuator is controlled by a sensor which can detect when a grasping device is in an intermediate axial position;

the transport elements are connected to one another so as to form a chain that is wound around a transport wheel mounted rotatably on a vertical axis, the transport wheel comprises a ring having recesses each designed to receive a preform with a collar, carrying each preform by its collar, each recess is associated with a bracket that is integral in terms of rotation with the transport wheel and mounted so as to be able to slide relative to the transport wheel, and the fixed ramp is arranged along the transport wheel, upstream of the point at which the chain leaves the transport wheel;

the conveyor system comprises a fixed ejection bar positioned at the same height as a portion of the preform, when the preform is carried by a recess, and positioned downstream of the point at which the chain leaves the transport wheel, so as to eject the preforms remaining in the recesses after the stud has been driven upward;

the inclined control surface of the fixed ramp is extended downstream by an intermediate control surface, so as to keep the grasping device in the release position at least as far as the ejection bar;

each grasping device comprises, at its upper axial end, a cylindrical portion with two facing radial bearing surfaces, each bracket comprises a post extending in a direction parallel to the axis of sliding of the associated grasping device, on the side of the axis of rotation of the transport wheel relative to the grasping device, and a connecting arm fixed to the upper axial end portion of the post and extending radially outward, and the connecting arm comprises, at its radial outer end, a fork that receives the cylindrical portion of the associated grasping device and comprises two radial bearing surfaces designed to interact with the radial bearing surfaces of the cylindrical portion so as to link the bracket and grasping device in terms of axial movement.

Further features and advantages of the invention will emerge from a reading of the following detailed description in conjunction with the attached drawings, in which:

FIG. 2 is a view in axial section along the axis A1 showing part of the transport wheel and a grasping device in the upper release position;

FIG. 3 is a view similar to that of FIG. 2 showing the transport wheel and a grasping device in the lower grasping position;

FIG. 4 is a view similar to that of FIG. 2 showing the transport wheel and a grasping device in the intermediate axial position;

Figure 1:
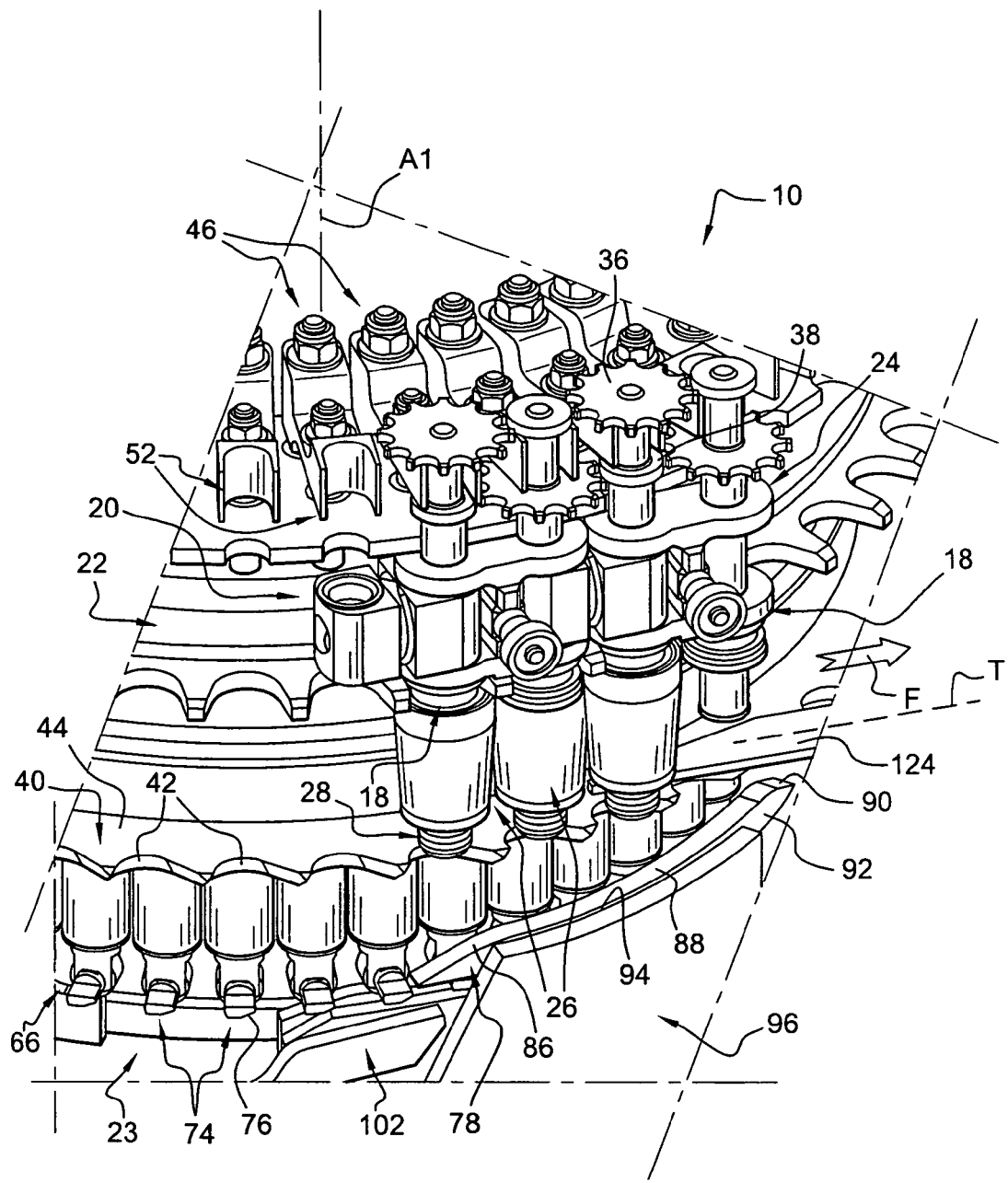
FIG. 1 is a schematic perspective view showing part of a conveyor system produced in accordance with the teaching of the invention, with the preform grasping devices in their lower grasping position.

In the following description, identical, similar or analog elements will be denoted by the same reference signs.

FIG. 1 to 4 show a conveyor system 10 for an installation for the manufacture of thermoplastic containers by blow molding using preforms 12, the preforms 12 being obtained beforehand by injection molding.

Each preform 12 is in the shape of a tube which is closed at one end and whose other end has the definitive shape of the neck 14 of the container that will be obtained from the preform, the neck 14 being delimited toward the top by an outer radial collar 16.

The conveyor system 10 comprises a number of transport elements 18 which are linked to one another so as to form an endless chain 20 and which are designed to transport the preforms 12 in the downstream direction, the direction indicated by the arrow F in FIG. 1.

Only part of the chain 20 has been shown in FIG. 1. This part of the chain 20 in this case consists of two transport elements 18.

The chain 20 of transport elements 18 is wound partially around a transport wheel 22 which is generally in the shape of a drum and is mounted so that it can rotate about a vertical axis A1 on a fixed base 23.

For the sake of simplicity, only a peripheral portion of the transport wheel 22 is shown in FIGS. 1 to 5.

In the remainder of the description, except where stated otherwise, the axial directions correspond to directions parallel to the axis (A1) of rotation of the transport wheel 22.

Each transport element 18 in this case has a link-shaped plate 24 with two grasping devices 26, each grasping device 26 comprising a mandrel 28 mounted so that it can move axially relative to the link-shaped plate 24, between an upper axial release position, shown in FIG. 2, and a lower axial grasping position, shown in FIG. 3, in which the mandrel 28 is engaged axially in the neck 14 of a preform 12 to seize it.

Each grasping device 26 comprises, at its upper axial end, a cylindrical portion 30 which is integral with the mandrel 28 in terms of axial movement and which has two facing radial bearing surfaces 32, 34.

According to the embodiment shown here, each cylindrical portion 30 comprises a toothed ring 36 at one axial end and an outer radial collar 38 at the other.

The two radial bearing surfaces 32, 34 in this case consist of the facing radial surfaces of the associated toothed ring 36 and outer radial collar 38 of the cylindrical portion 30.

The transport wheel 22 comprises a lower ring 40 having outer recesses 42 designed to each receive a preform 12. Each preform 12 is received in a recess 42 in such a way as to rest via its collar 16 on the upper transverse surface 44 of the lower ring 40.

Each recess 42 in the lower ring 40 is associated with a grasping device 26 and with a bracket 46 which is integral in terms of rotation with the wheel 22 and is mounted so that it can slide axially with respect to the wheel 22.

Each bracket 46 comprises a post 48 extending in a direction A3 parallel to the axis A2 of sliding of the associated grasping device 26, on the side of the axis A1 of rotation of the transport wheel 22 relative to the grasping device 26, and a connecting arm 50 which is fixed to the upper axial end portion of the post 48 and extends radially outward.

According to one feature of the invention, the connecting arm 50 comprises, at its radial outer end, a fork 52 that receives the cylindrical portion 30 of the associated grasping device 26 and comprises two radial bearing surfaces 54, 56 designed to interact with the radial bearing surfaces 32, 34 of the cylindrical portion 30 so as to link the bracket 46 and the grasping device 26 in terms of axial movement.

Each post 48 is mounted so that it can slide axially in said direction A3 in a cylindrical bore 51 made in the body of the transport wheel 22, in such a way that the bracket 46 is mounted so that it can slide axially relative to the transport wheel 22.

The post 48 comprises, at its lower axial end, a cam follower element 58, in this case a roller mounted so that it can freely rotate about an axis A4 extending in a radial direction relative to the axis A1 of rotation of the transport wheel 22.

A helical compression spring 60 is positioned axially between a radial bearing surface 62 provided on the lower axial end portion of the post 48 and a facing radial bearing surface 64 provided on the body of the transport wheel 22, so as to stress the bracket 46 axially downward.

Figure 5:
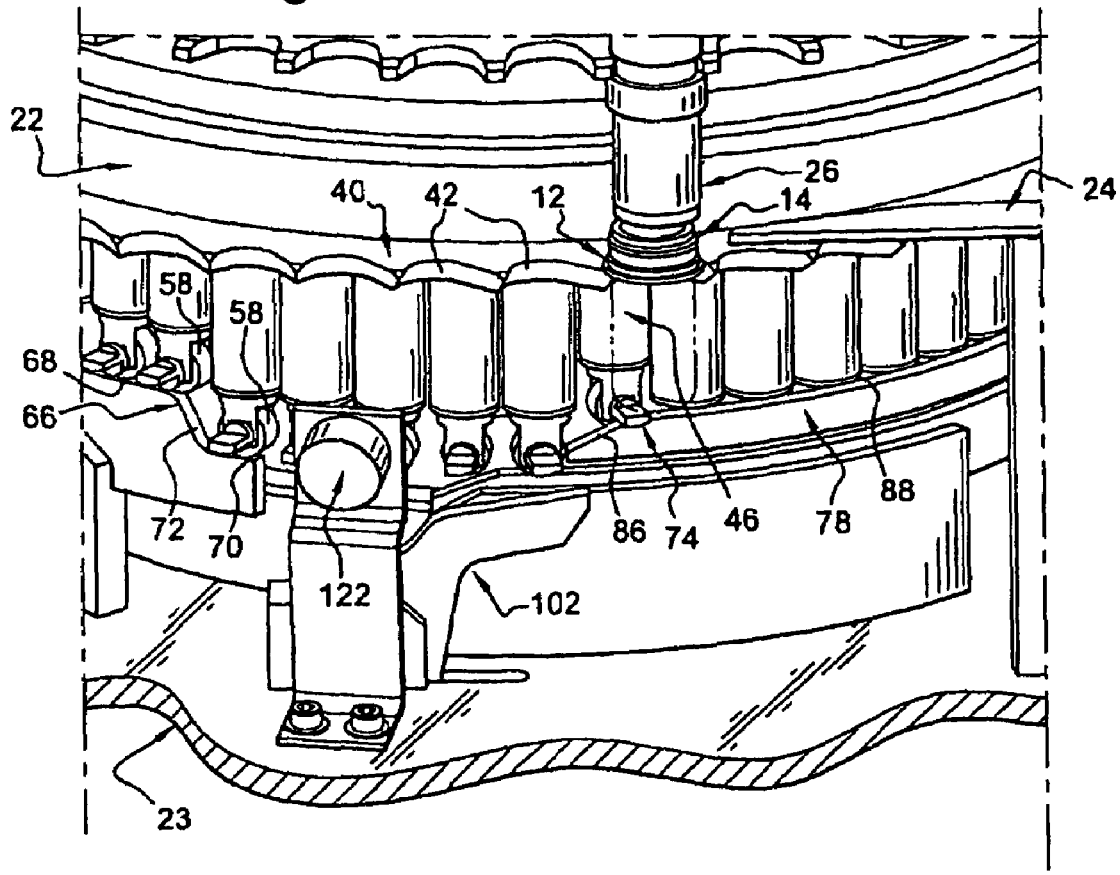
FIG. 5 is a view similar to that of FIG. 1 showing the system for diverting the studs associated with the grasping devices in the intermediate axial position with which the conveyor system of FIG. 1 is equipped, a stud being shown bearing on the fixed ramp of the diverting system.

As can be seen more particularly in the view of FIG. 5, a cam 66, which extends circumferentially around the axis A1 of rotation of the transport wheel 22, is mounted fixedly on the base 23.

The surface of the cam 66 acts as a receiving track for the cam follower element 58 with which each bracket 46 is equipped, in particular a raceway when this element 58 is a roller.

The surface of the cam 66 has a certain profile designed to control the axial position of each bracket 46 as a function of the circumferential position of the bracket 46 with respect to the axis A1 of rotation of the transport wheel 22. To this end, the height of the surface of the cam 66 varies circumferentially.

The position of the cam follower element 58 (in this case the roller) on the surface of the cam 66 thus determines the axial position of the mandrel 28.

The cam 66 in this case comprises an upstream portion 68 whose height is such that the bracket 46 is in its upper release position and a downstream portion 70 whose height, lower than the upstream portion 68, is such that the bracket 46 is in its lower grasping position.

The upstream portion 68 and the downstream portion 70 are connected by an inclined portion 72 that allows each roller to bring the bracket 46 down from the upper release position to the lower grasping position.

Note that the lower grasping position is in this case determined by an axial stop, the connecting arm 50 coming into axial abutment against the body of the transport wheel 22 (FIG. 3). Thus, the downstream portion 70 is not essential in this case to keep the bracket 46 in the lower position.

According to another feature of the invention, each post 48 comprises a stud 74 with a bearing surface 76 designed to interact slidingly with a fixed ramp 78 when the associated grasping device 26 is brought into an intermediate axial position between its upper release position and its lower grasping position, this intermediate axial position corresponding to an incorrect positioning of the associated mandrel 28 in the neck 14 of the preform 12.

Figure 6:
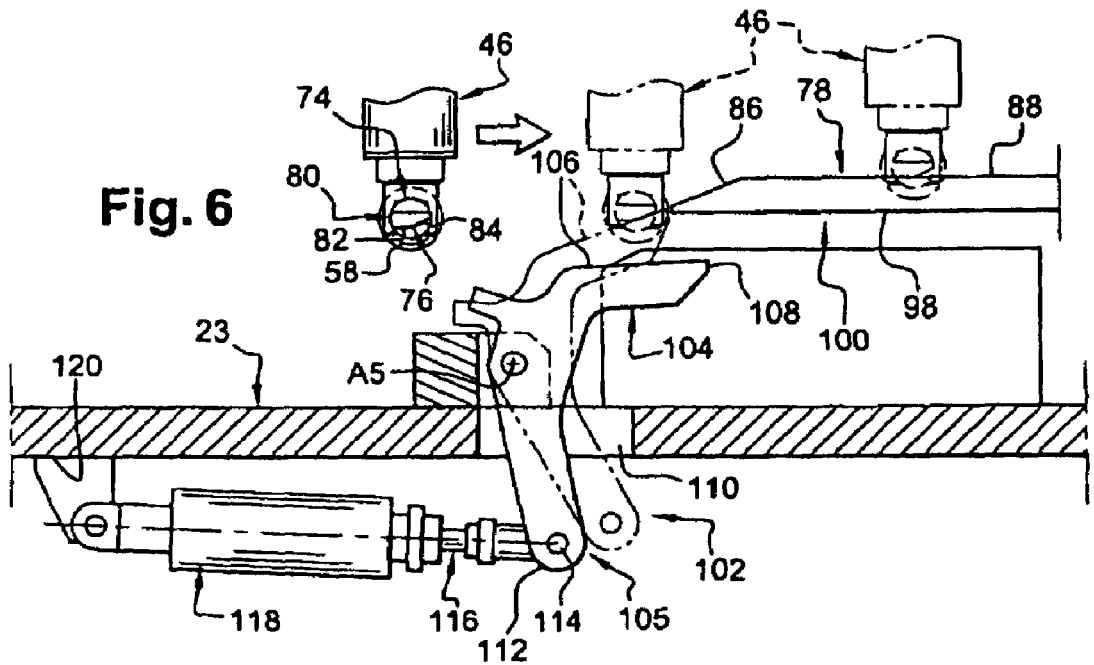
FIG. 6 is a view in section along a vertical plane parallel to the direction of movement of the preforms, schematically showing the diverting system of FIG. 5 when a grasping device is in an intermediate axial position.

As can be seen in particular in FIG. 6, the stud 74 in this case comprises a radial plate 80 whose lower face constitutes the bearing surface 76 that interacts with the fixed ramp 78.

The bearing surface 76 in this case consists of a radial face 82 upstream and an inclined face 84 downstream.

The fixed ramp 78 in this case has an upstream control surface 86, with a slope ascending in the downstream direction, an intermediate control surface 88 lying generally in a radial plane relative to the axis A1 of rotation, and a downstream control surface 90, with a slope descending in the downstream direction.

The control surfaces 86, 88, 90 of the fixed ramp 78 are oriented generally upward and are adjacent to one another.

Advantageously, the upstream control surface 86 of the fixed ramp 78 and the inclined face 84 of the stud 74 are substantially parallel when the stud 74 comes into contact with the upstream control surface 86.

The purpose of the various control surfaces 86, 88, 90 of the fixed ramp 78 will be explained below.

The fixed ramp 78 in this case consists of an attached part which is fixed, via an outer axial wall 92, to the internal axial face 94 of an axial support plate 96 fixed to the base 23 (FIG. 1).

The fixed ramp 78 is positioned axially at a certain height so that when the mandrel 28 of a grasping device 26 is in its lower grasping position then the stud 74 belonging to the associated bracket 46 can travel under the fixed ramp 78.

The fixed ramp 78 in this case comprises a downward-facing lower radial surface 98 that constitutes the roof of a passage 100 via which the studs 74 travel under the fixed ramp 78 when the associated brackets 46 are each in their lower position.

The fixed ramp 78 is arranged along the transport wheel 22, upstream of the point at which the chain 20 leaves the transport wheel 22.

In FIG. 1, it can be seen that the downstream transport element 18 is shown in the position corresponding to the point at which the chain 20 leaves the transport wheel 22.

Advantageously, the conveyor system 10 has a movable ramp 102 designed to extend the upstream control surface 86 of the fixed ramp 78 when it is in an active position, shown in chain line in FIG. 6.

The movable ramp 102 is mounted so that it can pivot relative to the base 23 about a pivoting axis A5 oriented generally radially with respect to the axis A1 of rotation of the transport wheel 22, between an angular active position and an angular retracted position.

The movable ramp 102 is in this case in the form of a vertical plate which is orthogonal to the pivoting axis A5 and comprises a portion forming a drive finger 104 and a portion forming a lever 105.

The drive finger 104 has a control surface 106 transverse to the movable ramp 102 which is oriented upward and which, in the active position, lies generally in the same plane as the upstream control surface 86 of the fixed ramp 78.

In the active position of the movable ramp 102, the free end edge 108 of the drive finger 104 is substantially adjacent to the upstream end of the upstream control surface 86 of the fixed ramp 78, closing off the upstream entry to the passage 100 located underneath the fixed ramp 78.

In the retracted position of the movable ramp 102, the drive finger 104 pivots downward so as to clear the upstream entry to the passage 100.

Note that the retracted position in this case constitutes a default position of the movable ramp 102.

The lever 105 in this case extends downward through a window 110 made in the base 23.

The free end 112 of the lever 105 is connected by a hinge 114 to the control shaft 116 of an actuator 118 mounted on the underside 120 of the base 23.

The purpose of the actuator 118 is to pivot the movable ramp 102 between its two angular positions, by acting on the lever 105 via the control shaft 116.

The actuator 118 may be operated for example pneumatically.

The conveyor system 10 in this case comprises a sensor 122 positioned upstream, near the movable ramp 102, which can detect the presence of a bracket 46 in an intermediate axial position, so as to operate the actuator 118 accordingly.

The way in which the conveyor system 10 according to the invention works will now be described with reference to one preform 12 in particular, from its arrival on the transport wheel 22 until it leaves the transport wheel 22.

As the transport wheel 22 is driven in rotation about its axis A1, it moves the chain 20 of transport elements 18 continuously in the direction of the arrow F.

The device (not shown) for supplying preforms 12 to the transport wheel 22 places the preform in a recess 42 in the lower ring 40, in a supply zone (not shown) located upstream of the point where the chain 20 leaves the transport wheel 22.

In the supply zone, the mandrel 28 and the bracket 46 associated with the recess 42 carrying the preform 12 are in their upper release position, the roller constituting the associated cam follower element 58 traveling on the upstream portion 68 of the cam surface 66.

When the preform 12 reaches a seizing area, the roller then descends from the upstream portion 68 of the surface of the cam 66 to the downstream portion 70, stressed by the spring 60 which relaxes, bringing the bracket 46 and the mandrel 28 into their lower grasping positions.

If the mandrel 28 engages correctly in the neck of the preform 12, as shown in FIG. 3, then the bracket 46 descends down to its lower grasping position. The preform 12 is thus correctly seized by the mandrel 28 and the preform 12 can be conveyed by the associated transport element 18 downstream, out of the transport wheel 22.

In the lower grasping position, the stud 74 associated with the bracket 46 passes under the fixed ramp 78, into the passage 100, the movable ramp 102 being in its retracted position.

The bracket 46 continues its circumferential movement around the axis A1 of rotation of the transport wheel 22, while the transport element 18 leaves the transport wheel 22, following the movement of the chain 20 in the direction indicated by the arrow F and the chain line T.

When the transport element 18 leaves the transport wheel 22, the two cylindrical portions 30 of each transport element 18 come away from the associated forks 52 so that the grasping devices 26 are no longer linked to the brackets 46.

If the mandrel 28 is unable to engage correctly in the associated preform 12, as shown in FIG. 4, then the bracket 46 cannot descend into its lower grasping position. The bracket 46 is thus immobilized in an intermediate axial position, between its upper release position and its lower grasping position.

FIG. 6 shows, in solid line, the lower axial end of a bracket 46 in this axial intermediate position, before it reaches a "diverting" area comprising the movable ramp 102 and the fixed ramp 78.

This intermediate axial position is detected by the sensor 122 which then operates the actuator 118 to cause the movable ramp 102 to pivot, in the anti-clockwise direction with reference to FIG. 6, into its active position, which is shown in chain line in FIG. 6.

Advantageously, the movable ramp 102 is placed in its active position for a length of time just sufficient to divert the stud 74 associated with the bracket 46 in the intermediate position, without affecting the studs 74 associated with the adjacent brackets 46 which are in the lower, and therefore correct, position.

When the movable ramp 102 takes up its active position, the inclined face 84 of the stud 74 associated with the bracket 46 in the intermediate position comes into contact with the control surface 106 of the movable ramp 102, as can be seen in FIG. 6 with the first bracket 46 in chain line.

Because of the continuous circumferential movement of the bracket 46 around the axis A1 of rotation, the bearing surface 76 of the stud 74 interacts slidingly with the control surface 106 of the movable ramp 102 and then the upstream control surface 86 of the fixed ramp 78 to bring the bracket 46 from its intermediate position upward into its upper release position, so that the mandrel 28 can disengage itself from the neck 14 of the preform 12.

When the radial face 82 of the bearing surface 76 of the stud 74 slides on the intermediate control surface 88 of the fixed ramp 78, as can be seen in FIG. 5 and in FIG. 6 with the second bracket 46 in chain line, then the bracket 46 takes up its upper release position.

The intermediate control surface 88 keeps the bracket 46 in the upper release position for a certain circumferential portion of the rotation of the transport wheel 22.

At this stage, the preform 12 is no longer held either by the mandrel 28 or any other retaining system, so that it can be ejected from the recesses 42 in the transport wheel 22.

The preform 12 can for example fall by gravity and/or owing to a centrifugal force.

Advantageously, according to the embodiment shown here, the conveyor system 10 is equipped with a fixed ejection bar 124 positioned downstream of the point at which the chain 20 leaves the transport wheel 22, so as to eject any preform 12 remaining in its recess 42 after the mandrel 28 has disengaged itself.

The ejection bar 124 in this case takes the form of a strip which is substantially parallel to the chain 20 as it leaves the transport wheel 22, and which lies partially above the lower ring 40 so that the ejection bar 124 is at the same height as the neck 14 of the preform 12 so as to eject the preform 12 out of the associated recess 42.

Advantageously, the ejection bar 124 lies above the intermediate control surface 88 of the fixed ramp 78, and the downstream control surface 90 of the fixed ramp 78 is positioned downstream of the ejection bar 124 so as to bring the bracket 46 into its lower grasping position only when it is certain that there is no longer any preform 12 in the associated recess 42.

Of course, the surface of the cam 66 comprises, downstream of the fixed ramp 78, an ascending portion (not shown) for bringing each bracket 46 from its lower grasping position into its upper release position, to allow another preform 12 to be seized.

According to a variant (not shown), the conveyor system 10 according to the invention may possibly not include a movable ramp 102. All that is required is to position the free end of the upstream control surface 86 at an appropriate height so as to divert all the studs 74 associated with brackets 46 in the intermediate position upward and allow all the studs 74 associated with brackets 46 in the lower position to pass through.

The invention claimed is:

1. A conveyor system (10) for an installation for the manufacture of thermoplastic containers by blow molding using preforms (12), of the type comprising a number of transport elements (18) which each have at least one grasping device (26) for carrying a preform (12) so as to convey it, in the vertical position, along a path in the downstream direction, inside the installation, of the type in which each grasping device (26) can move along a vertical axis (A2) relative to the transport element (18) carrying it so as, when it is brought from an upper release position to a lower grasping position, to engage axially in the neck (14) of the preform (12) to be seized, characterized in that each grasping device (26) is linked in terms of upward and downward axial movement to an associated bracket (46) which is mounted so that it can slide axially in one direction (A3) and which bears, at its lower axial end, a cam follower element (58), the bracket (46) being stressed axially downward so that the cam follower element (58) interacts with a surface of a fixed cam (66) provided to bring the grasping device (26) from its upper release position to its lower grasping position, in that the bracket (46) comprises a stud (74) with a bearing surface (76) designed to interact slidingly with a fixed ramp (78) comprising a control surface (86) which is inclined relative to the vertical and oriented generally upward, when the grasping device (26) is in an intermediate axial position between its upper release position and its lower grasping position, this intermediate axial position corresponding to an incorrect positioning of the grasping device (26) in the preform (12), so that the fixed ramp (78) brings the stud (74) upward and causes the grasping device (26) to slide axially into its upper release position so as to eject the associated preform (12), and in that the fixed ramp (78) extends axially at a certain height in such a way that, when the grasping device (26) is in its lower grasping position, the stud (74) can travel under the fixed ramp (78) in a passage (100) provided for this purpose.

2. The conveyor system (10) as claimed in claim 1, characterized in that it comprises a movable ramp (102) which can take up:
- an active position in which a control surface (106) of the movable ramp (102) is adjacent to the upstream end of the inclined control surface (86) of the fixed ramp (78), and in which the control surface (106) of the movable ramp (102) closes off the entry to said passage (100) so as to drive the stud (74) upward onto the fixed ramp (78);
- and a retracted position in which the movable ramp (102) clears said passage (100) to allow the stud (74) to travel under the fixed ramp (78), and in that it comprises an actuator (118) that causes the movable ramp (102) to take up the active position when a grasping device (26) is in an intermediate axial position.

3. The conveyor system (10) as claimed in claim 2, characterized in that the actuator (118) is controlled by a sensor (122) which can detect when a grasping device (26) is in an intermediate axial position.

4. The conveyor system (10) as claimed in claim 1, characterized in that the transport elements (18) are connected to one another so as to form a chain (20) that is wound around a transport wheel (22) mounted rotatably on a vertical axis (A1), in that the transport wheel (22) comprises a ring (40) having recesses (42) each designed to receive a preform (12) with a collar (16), carrying each preform (12) by its collar (16), in that each recess (42) is associated with a bracket (46) that is integral in terms of rotation with the transport wheel (22) and mounted so as to be able to slide relative to the transport wheel (22), and in that the fixed ramp (78) is arranged along the transport wheel (22), upstream of the point at which the chain (20) leaves the transport wheel (22).

5. The conveyor system (10) as claimed in claim 4, characterized in that it comprises a fixed ejection bar (124) positioned at the same height as a portion of the preform (12), when the preform (12) is carried by a recess (42), and positioned downstream of the point at which the chain (20) leaves the transport wheel (22), 50 as to eject the preforms (12) remaining in the recesses (42) after the stud (74) has been driven upward.

6. The conveyor system (10) as claimed in claim 5, characterized in that the inclined control surface (86) of the fixed ramp (78) is extended downstream by an intermediate control surface (88), so as to keep the grasping device (26) in the release position at least as far as the ejection bar (124).

7. The conveyor system (10) as claimed in claim 4, characterized in that each grasping device (26) comprises, at its upper axial end, a cylindrical portion (30) with two facing radial bearing surfaces (32, 34), in that each bracket (46) comprises a post (48) extending in a direction parallel to the axis (A2) of sliding of the associated grasping device (26), on the side of the axis of rotation (A1) of the transport wheel (22) relative to the grasping device (26), and a connecting arm (50) fixed to the upper axial end portion of the post (48) and extending radially outward, and in that the connecting arm (50) comprises, at its radial outer end, a fork (52) that receives the cylindrical portion (30) of the associated grasping device (26) and comprises two radial bearing surfaces (54, 56) designed to interact with the radial bearing surfaces (32, 34) of the cylindrical portion (30) so as to link the bracket (46) and grasping device (26) in terms of axial movement.

* * * * *